(12) United States Patent
Määttä et al.

(10) Patent No.: US 8,545,202 B2
(45) Date of Patent: *Oct. 1, 2013

(54) MOULD SYSTEM FOR MANUFACTURING A CONTAINER

(75) Inventors: Päivi Määttä, Imatra (FI); Panu Tanninen, Rauha (FI); Olavi Pirttiniemi, Järvelä (FI); Noora Nylander, Lahti (FI); Jalliina Järvinen, Lahti (FI); Teemu Karhu, Imatra (FI)

(73) Assignee: Stora Enso Oyj, Helsinki (FI)

( * ) Notice: Subject to any disclaimer, the term of this patent is extended or adjusted under 35 U.S.C. 154(b) by 122 days.

This patent is subject to a terminal disclaimer.

(21) Appl. No.: 12/863,570

(22) PCT Filed: Aug. 12, 2009

(86) PCT No.: PCT/FR2009/050659
§ 371 (c)(1),
(2), (4) Date: Jul. 19, 2010

(87) PCT Pub. No.: WO2010/018308
PCT Pub. Date: Feb. 18, 2010

(65) Prior Publication Data
US 2010/0283182 A1 Nov. 11, 2010

(30) Foreign Application Priority Data
Aug. 12, 2008 (FI) ..................................... 20080461

(51) Int. Cl.
B29C 45/14 (2006.01)

(52) U.S. Cl.
USPC ........... 425/112; 425/412; 425/414; 425/416; 425/451.9

(58) Field of Classification Search
USPC ................. 425/412, 414, 416, 451.9, 112
See application file for complete search history.

(56) References Cited

U.S. PATENT DOCUMENTS 3,436,008 A * 4/1969 Santangelo ................... 229/406
4,705,471 A * 11/1987 Shah et al. ..................... 425/195
(Continued)

FOREIGN PATENT DOCUMENTS
JP 8-207924 A 8/1996
JP 2000-335550 A 12/2000
(Continued)

OTHER PUBLICATIONS
Finnish Search Report from FI 20080461, dated Apr. 29, 2009.
(Continued)

Primary Examiner — Robert J Grun
(74) Attorney, Agent, or Firm — Birch, Stewart, Kolasch & Birch, LLP

(57) ABSTRACT

A mould system for manufacturing a container which includes a movable mould half and a stationary mould half which are positioned opposite to each other, wherein the movable mould half includes a core plate provided with a core, a plate-like seal ring that is movable relative to the core, a seal surface which surrounds the core, and a collar ring that is movable relative to the core and the stationary mould half includes a mould plate provided with a mould cavity and a seal surface, wherein in the mould system, a plate-like insert is connected to the seal surface of the seal ring, the insert including a recess which is in contact with a front edge of the seal surface, so that it is in flow communication with molten plastic material flowing from the direction of the collar ring.

7 Claims, 13 Drawing Sheets

(56) References Cited

U.S. PATENT DOCUMENTS

| | | | |
|---|---|---|---|
| 5,425,972 A | 6/1995 | Calvert | |
| 2002/0110615 A1 | 8/2002 | Ciccone et al. | |
| 2005/0159284 A1 | 7/2005 | Smith et al. | |
| 2007/0267374 A1 | 11/2007 | Middleton et al. | |

FOREIGN PATENT DOCUMENTS

| | | |
|---|---|---|
| WO | WO 00/21854 A1 | 4/2000 |
| WO | WO 01/76976 A1 | 10/2001 |
| WO | WO 03/033258 A1 | 4/2003 |
| WO | WO 2009/074721 A1 | 6/2009 |

OTHER PUBLICATIONS

International Search Report from PCT/FI2009/050659, dated Dec. 29, 2009

* cited by examiner

MOULD SYSTEM FOR MANUFACTURING A CONTAINER

The invention relates to a mould system according to the preamble of claim 1, including a movable mould half and a stationary mould half, which mould halves are located opposite to each other; the mould system can be used to manufacture a container that comprises a bottom, which is pressed from a cardboard blank, walls that are connected to the bottom and a (plastic) rim that is at least partly moulded of plastic and connected to the upper edge of the walls, encircling the walls.

In food industry, in particular, so-called tray packages are used as storage packages, consisting of lidded containers that have a bottom, walls that encircle the bottom and extend upwards, and a rim that encircles the upper edge of the walls and extends outwards. The container is closed with a lid that is connected to the rim. In such containers, the material of the container bottom and walls often comprises cardboard, on top of which plastic and/or metal layers may be added, which change the steam and/or oxygen transmission properties of the cardboard, depending on the application.

Generally, such a so-called tray package is used for storing foodstuffs, whereby it is closed hermetically by the lid. To be able to attach the lid to the package, the edge of the container that is used as tray package must be provided with a horizontal rim, which protrudes from the upper end of the side walls and encircles the package. On the upper surface of the rim, there is usually a suitable coating, by means of which the lid can be fastened tightly to the package. For example, it is very common to use heat-sealable plastic materials for fastening the lid part to the package. As examples of food packages and packaging materials used therein, among others, the patent specifications WO-03/033258, EP-1289856, WO-00/21854 and U.S. Pat. No. 5,425,972 could be mentioned.

Such a container with the shape of a tray, comprising a bottom pressed from a cardboard blank, walls connected to the bottom and a rim that is at least partly cast of plastic and connected to the upper edge of the walls, encircling the walls, can be formed by various methods. The published application FI20070973 describes a manufacturing method of a tray package, wherein the container is formed from a straight cardboard blank by pressing to shape in a mould system, which includes a moving mould half and a stationary mould half, which are located opposite to each other, whereby the mould half that is movable with respect to the stationary mould half includes at least a core plate provided with a core, a plate-like seal ring, which is movable with respect to the core and has a seal surface and surrounds the core, and a collar ring, which can be moved with respect to the core and the seal ring and fitted between the same, and which can be used to form the rim on the container; and the stationary mould half includes at least a mould plate provided with a mould cavity and a seal surface.

A cardboard blank that is pressed to shape by such a mould system is brought on the mould cavity of the stationary mould half, the core of the moving mould half settles into the mould cavity, and the cardboard blank remaining between the core and the mould cavity is moulded into a container with the shape of a tray. At the end stage of the compression moulding, a rim that extends sideways is cast of a plastic material on the upper part of the side walls of the package, when the mould is kept closed in such a way that a mould cavity corresponding to the rim is formed by moving a counter surface inside the mould system backwards from a surface opposite to it, after which the casting material is introduced into the mould cavity. In the cavity, the material solidifies into a fixed rim, after which the mould is opened and the finished container-shape package is removed from the mould.

With the above prior art as basis, the object of the applicant was to provide a more versatile manufacturing method of tray packages, wherein the same mould system could be used to manufacture different containers that are used as tray packages and wherein the dimensions of the rim could change, the rim could be provided with various functional or decorative formations, such as ridges that encircle the rim for attaching the lid to the rim, or with projections of the basic rim, which can comprise suspension means, such as openings.

Surprisingly, it has now been observed that by modifying the seal ring or the collar ring of the mould system described above by means of various inserts, which are detachably attached to the seal surface of the seal ring or the collar of the collar ring, the dimensions and shapes of the rim can be modified as desired.

To be more precise, the invention relates to a mould system according to claim 1 for manufacturing a container. Such a mould system includes a movable mould half and a stationary mould half, which are located opposite to each other; the mould system can be used to manufacture a container, which comprises a bottom that is pressed from a cardboard blank, walls that are connected to the said bottom and a rim that is at least partly cast of plastic and connected to the upper edge of the walls, encircling the walls, whereby the mould half that is movable with respect to the stationary mould half includes at least a core plate provided with a core, a plate-like seal ring that is movable with respect to the core and comprises a seal surface and surrounds the core, and a collar ring, which is movable with respect to the core and the seal ring and can be fitted between the same, and the stationary mould half includes at least a mould plate provided with a mould cavity and a seal surface. In the mould system, a plate-like insert is connected to the seal surface of the seal ring, its one edge being on the plane defined by the front edge of the seal surface, the insert comprising a recess, which has the shape of the projection that is cast on the basic rim and which is in contact with the front edge of the seal surface of the seal ring, so that it is in flow communication with the molten plastic that flows from the direction of the collar ring.

In this context, the basic rim refers to the plastic rim, which encircles the upper edge of the container wall and protrudes from the upper edge and which can be manufactured by the method disclosed in the published application FI20070973.

In the method according to the invention, the cardboard blank is pressed between the core and the mould cavity to form the container bottom and walls that encircle the bottom, after which a flange-like rim is formed by casting on the upper edge of the walls, encircling the walls, by introducing molten plastic into the casting cavity, which is limited by the seal surface of the mould plate, the seal surface of the seal ring and the seal surface of the collar ring, whereby the shape and/or dimensions of the casting cavity are changed by arranging, on the front edge of the seal surface of the seal ring, at least one plate-like insert, which is detachably attached and comprises a recess that has the shape of the intended projection and is embedded in the plate-like frame of the insert, the recess possibly comprising one or bulges that extend upwards towards the surface of the plate-like frame, whereby the said recess of the insert is in contact with the front edge of the seal ring.

The invention is based on the fact that, depending on the changes that are to be made on the plastic rim of the cardboard-based container that comprises a bottom and walls, inserts are detachably attached to the seal surface of the collar ring or the seal surface of the seal ring of the movable mould half, changing the function and/or shape of these seal surfaces. When the molten plastic is conveyed to the mould cavity at the manufacturing stage of the container rim, the inserts change the shape and dimensions of the mould cavity, so that similar changes are correspondingly made on the rim of the container that is manufactured. Typically, the inserts of the seal ring change the shape of the annular container rim by adding thereto projections that project from the annular basic rim in a radial direction, which projections can be provided with openings. The inserts of the seal ring are placed peripherally on the front edge of the seal ring, i.e., on the front edge of the seal ring that surrounds the collar ring annularly, from where the inserts project in the radial direction of the seal and collar rings (the collar ring and the seal ring are placed concentrically around the core).

In a preferred embodiment of the invention, several inserts that are relatively small in the peripheral direction of the front edge are placed on the periphery of the front edge of the seal ring, their frames being directed away from the front edge in the peripheral direction of the seal ring. When the dimension of each insert in the peripheral direction of the front edge of the seal ring is kept relatively small (preferably about 10-20% maximum of the peripheral total length of the front edge of the seal ring), the insert can, in fact, be quite large as such, but the blank of the projection of the edge flange (the recess) in it should be kept relatively small compared to the peripheral total length of the front edge of the seal ring; this is to ensure that the retaining capacity of the seal ring remains adequate throughout the manufacturing process of the container. It should be noted that if the inserts were placed on the side of the front mould of the mould system, e.g., in the seal ring that surrounds the mould cavity, as in the patent application US 2007267374, this could easily cause problems with the removal of the product, among others, as the plastic would shrink tightly around the shapes of the replacement piece of the front mould, and no ejection can be arranged in the front mould. In the method described in the invention, the product stays in place in the rear mould, whereby it is easy to push out of the mould.

By using the detachable inserts, the shape and dimensions of the rim can be changed considerably quicker than by replacing the entire collar ring or seal ring with another collar ring or seal ring. In this way, the mould system becomes modular and changes are easy and simple to make without changing the operation of the entire mould system.

In a preferred embodiment of the invention, one or more detachable inserts, which are provided with a recess and, possibly, a bulge located in the recess, are attached on top of the seal surface of the seal ring, and by which projections are formed, which are directed outwards from the basic rim of the container and which may comprise suspension means, such as openings. The shape of the projections may vary and each of them may comprise one or more openings with different shapes.

In another preferred embodiment of the invention, a raising collar is detachably attached on top of the basic collar of the collar ring of the movable mould half of the mould system, its seal surface comprising bulges, which slightly rise from the rest of the plane of the said seal surface, and embossed patterns or bulges that are placed in the recess on the seal surface and extend to the plane of the seal surface, at the most, or recesses or grooves that are lower than the rest of the plane of the seal surface; the bulges, embossed patterns, recesses or grooves making it possible to provide, on the container plastic rim, bulges that slightly rise from the rest of its plane, grooves and depressions between the bulges, and embossed patterns in these depressions.

In the following, the invention is illustrated in detail by the appended figures.

Figure 6A:
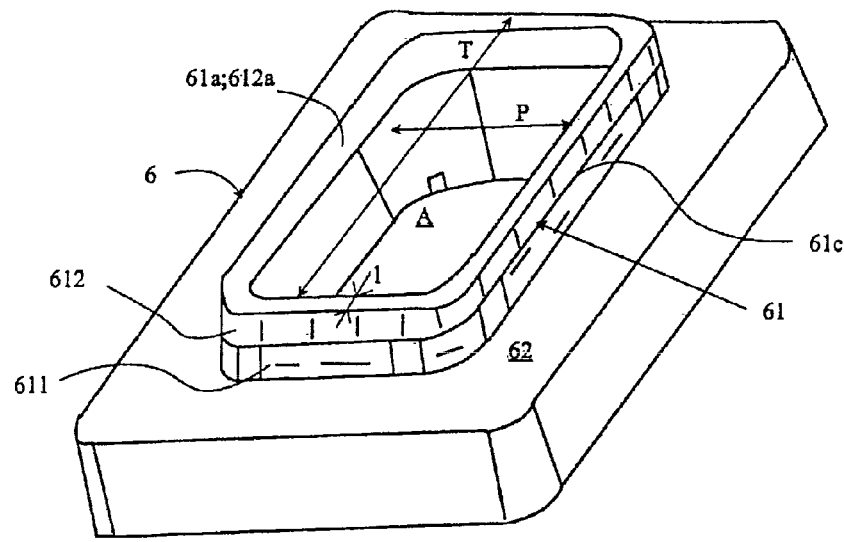
Figure 6B:
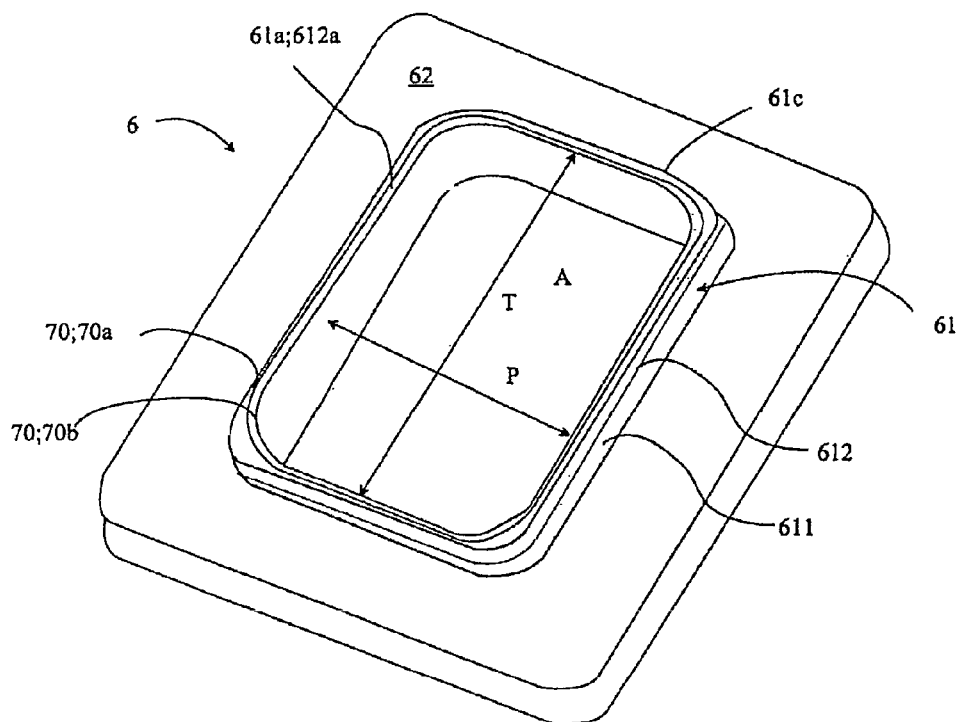
Figure 6C:
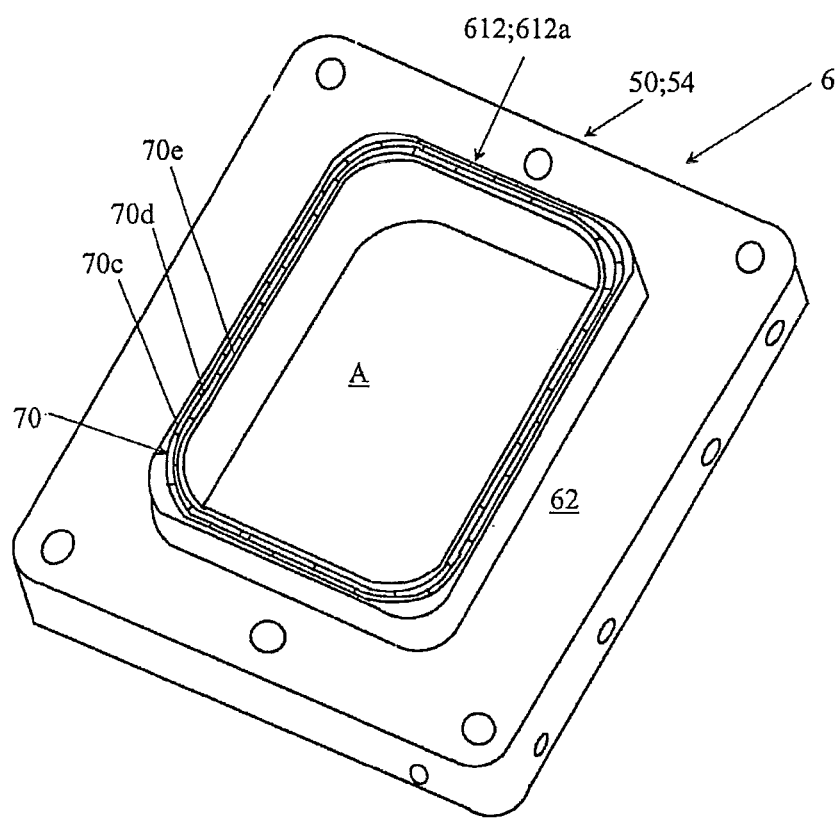

FIGS. 6A and 6B 6C are perspective views of the collar ring options of the mould system according to the invention.

Figure 7A:
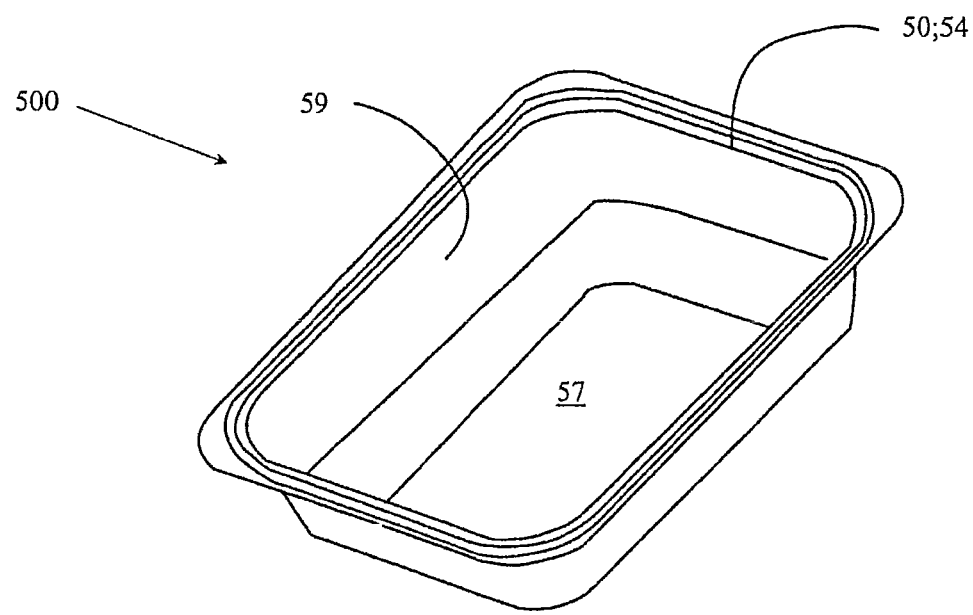

FIG. 7A is a perspective view of the containers provided by the collar ring according to FIG. 6B.

Figure 7B:
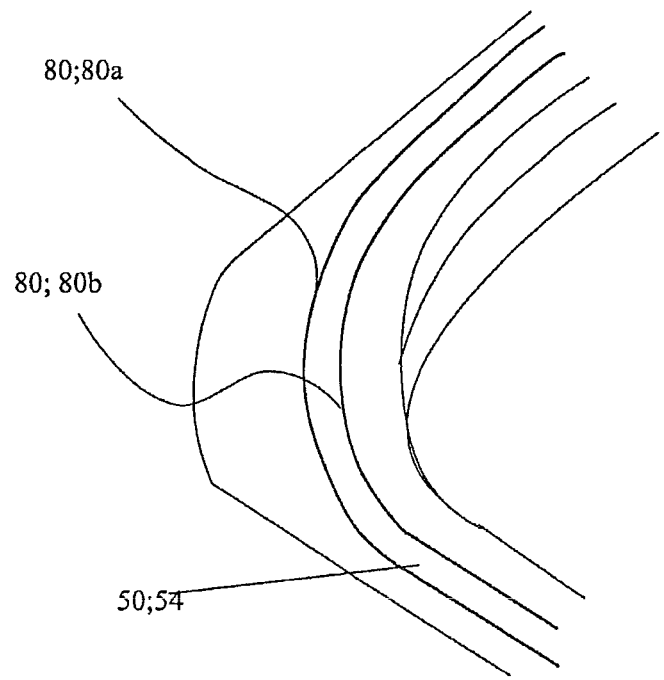

FIG. 7B is an enlarged top view of one corner of the edge of the container according to FIG. 7A.

Figure 7C:
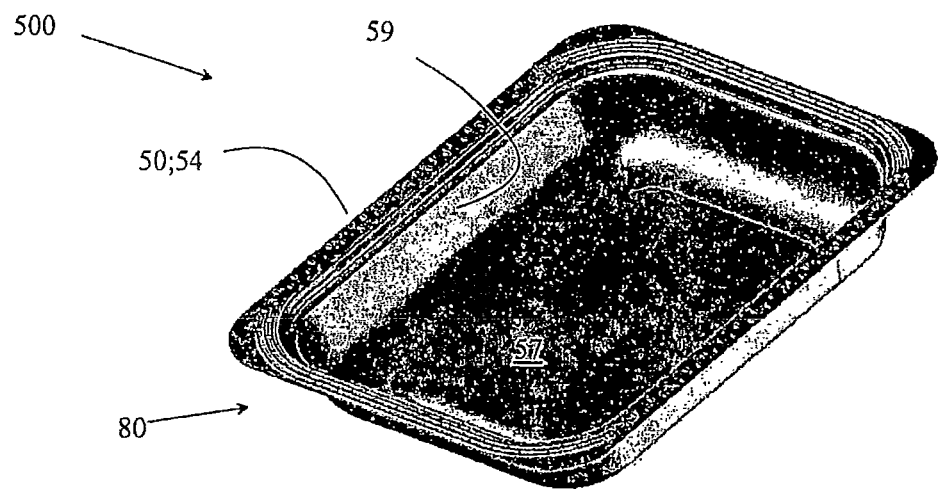

FIG. 7C is a perspective view of containers provided by the collar ring according to FIG. 6C.

Figure 7D:
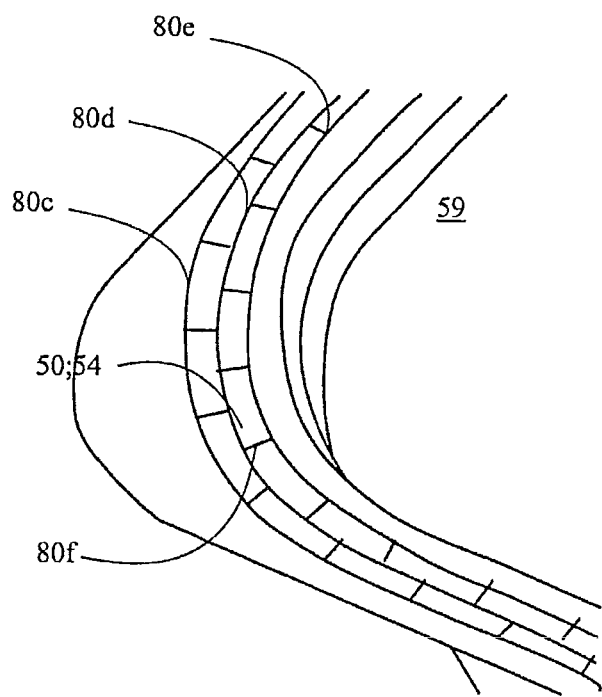

FIG. 7D is an enlarged top view of the corner of one edge of the container according to FIG. 7C.

Figure 8:
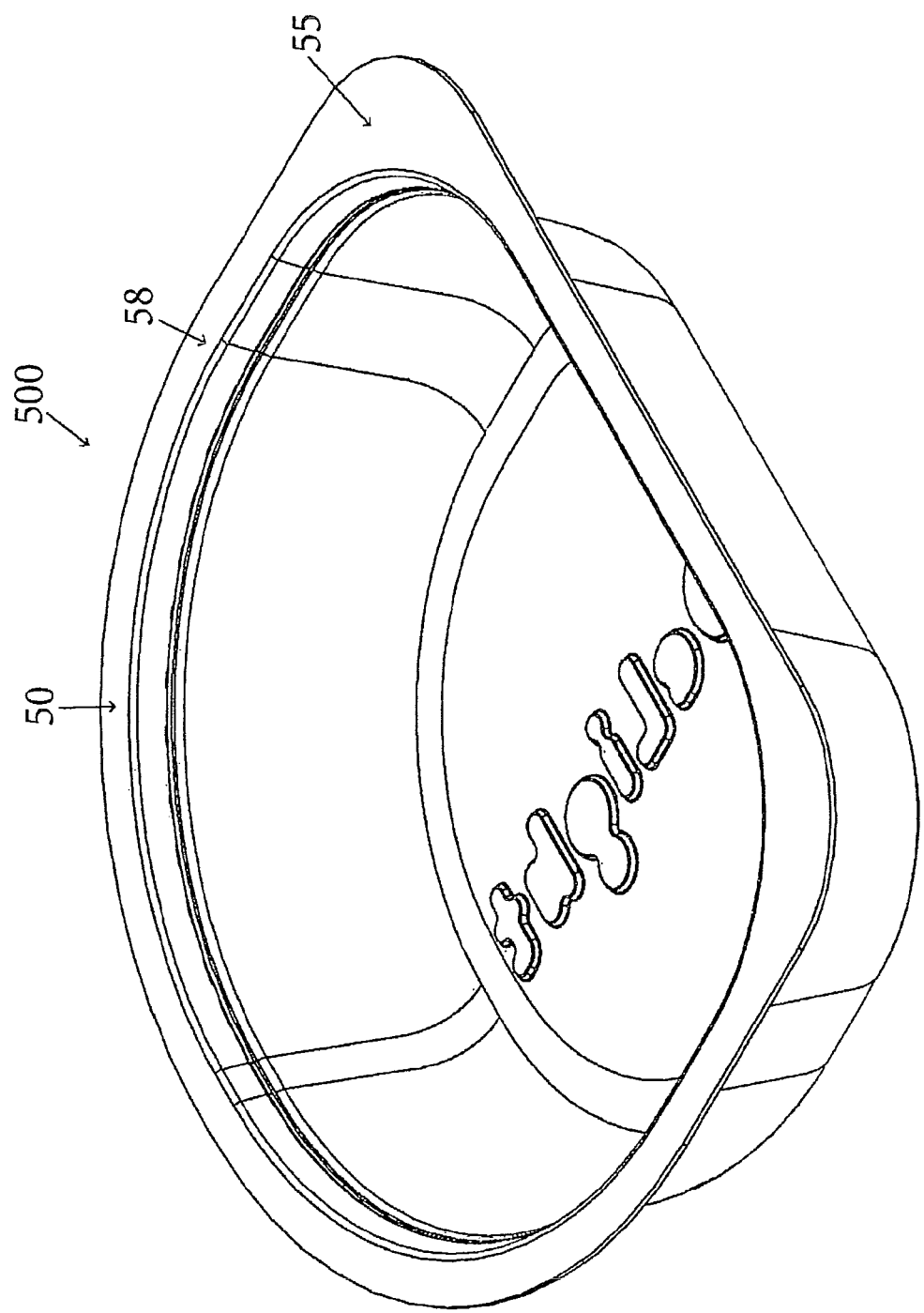

FIG. 8 is a perspective view of a container with a cross section similar to D, wherein an unsymmetrical D-shape annular basic rim is formed, from which two projections project.

Figure 9:
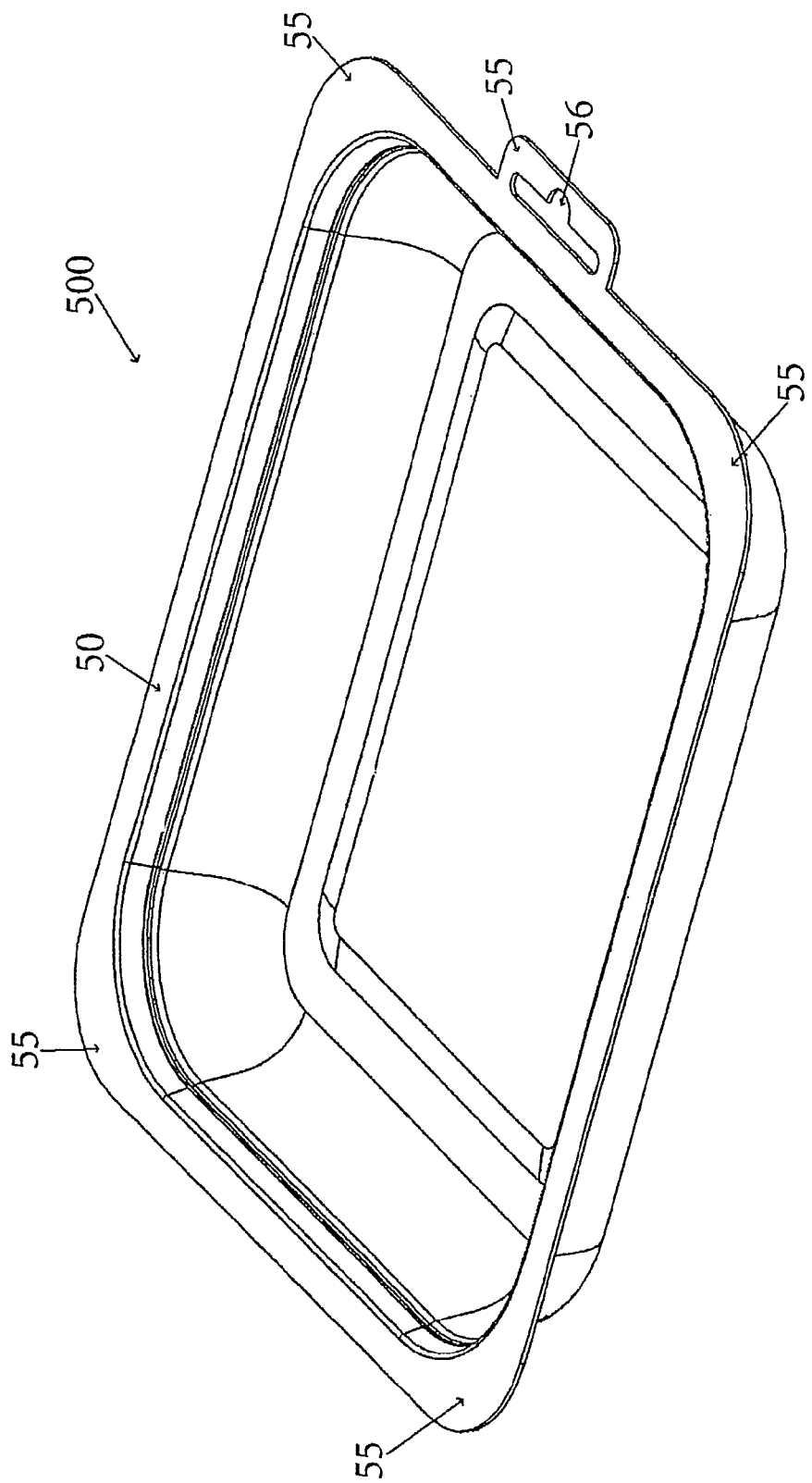

FIG. 9 is a perspective view of a container with a cross section similar to a rectangle, wherein an annular basic rim with the shape of a rounded rectangle is formed, from which a projection projects, having a relatively wide opening that is limited to the basic rim.

In the following, the mould system 1 is essentially described first and the operation of the mould system 1 by means of FIGS. 1-3. Regarding the collar ring and the seal ring, the mould systems shown in FIGS. 2A and 2B are not the same as those used in the invention, but they can illustrate the basic structure of the mould system according to the invention.

Figure 1:
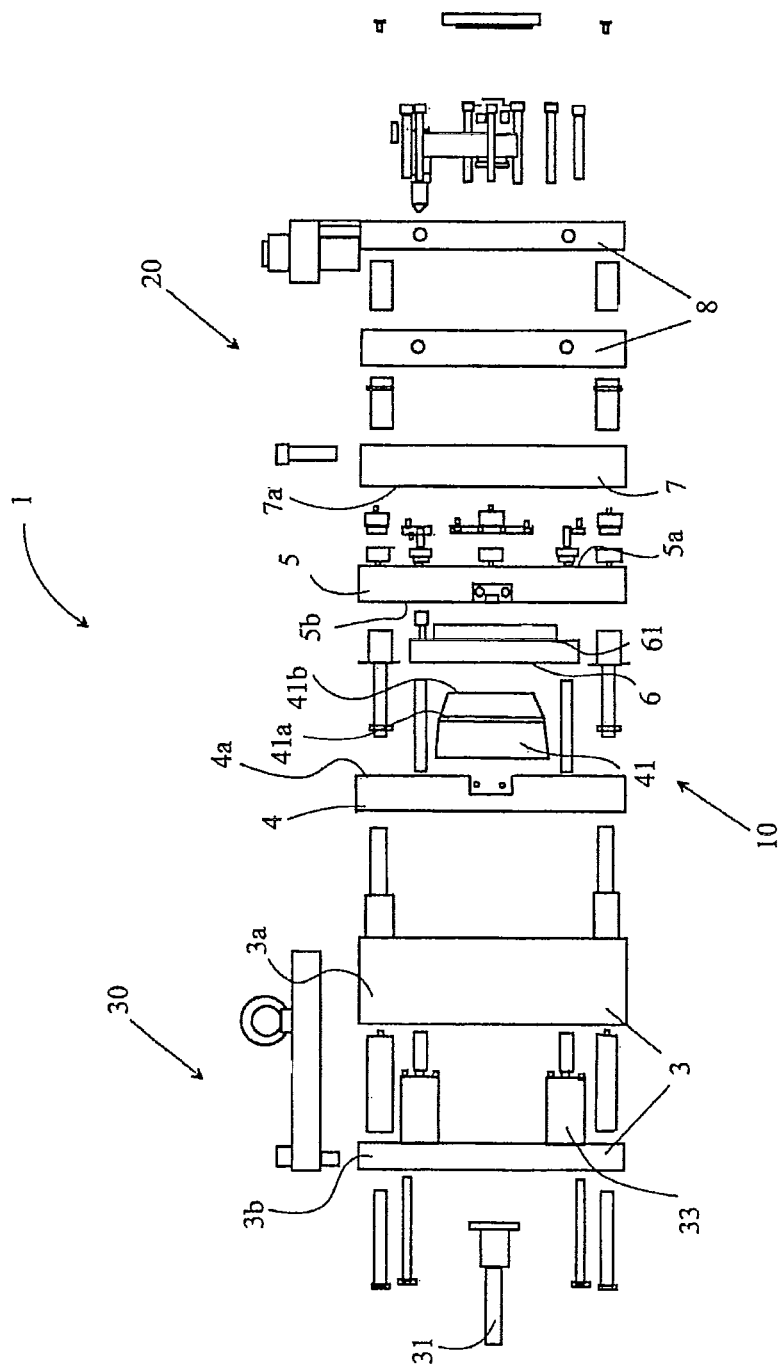
FIG. 1 is an exploded, cross-sectional side view of the mould system.
Figure 2A:
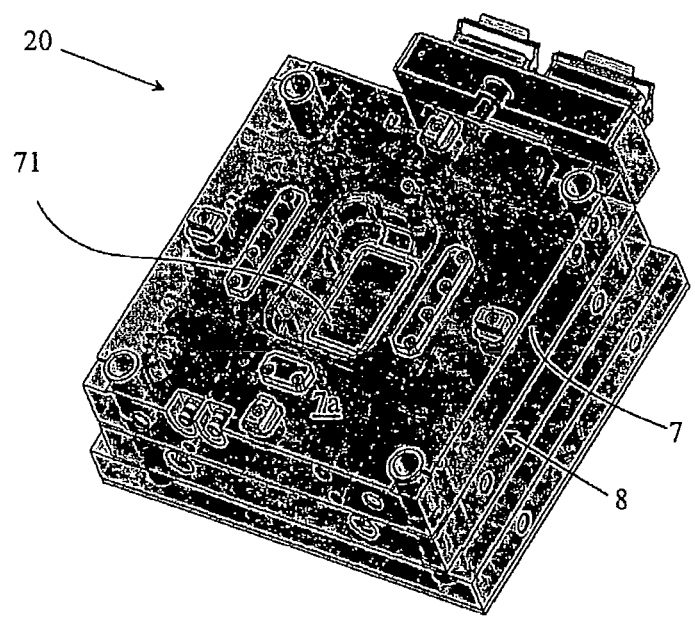
FIGS. 2A and 2B are perspective views of a mould system according to the prior art.
Figure 2B:
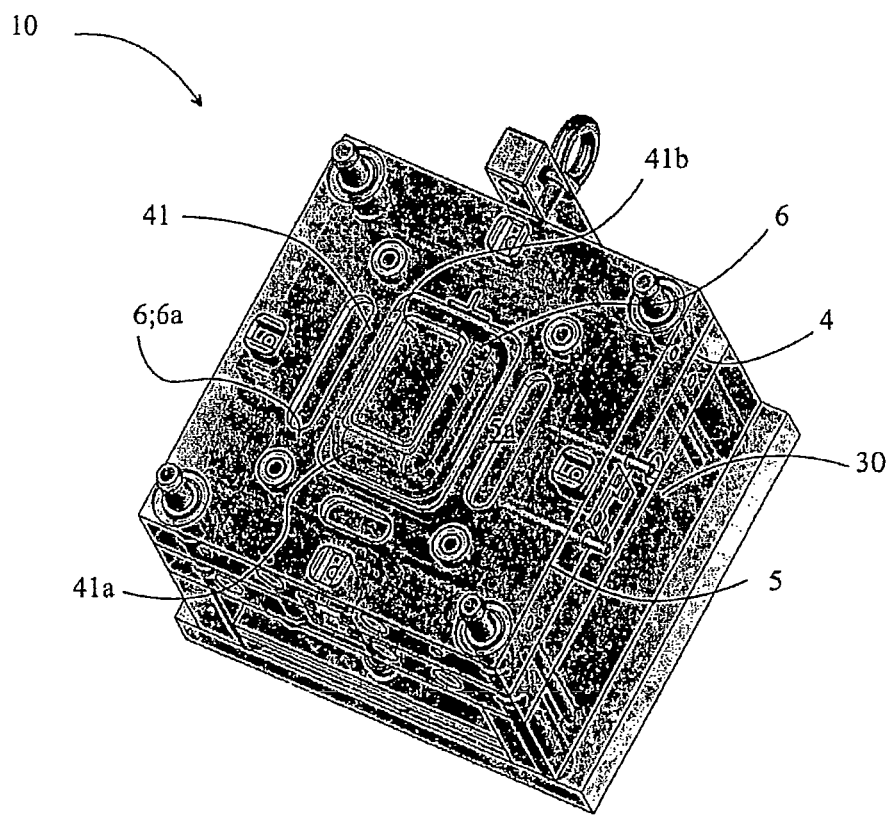
Figure 2C:
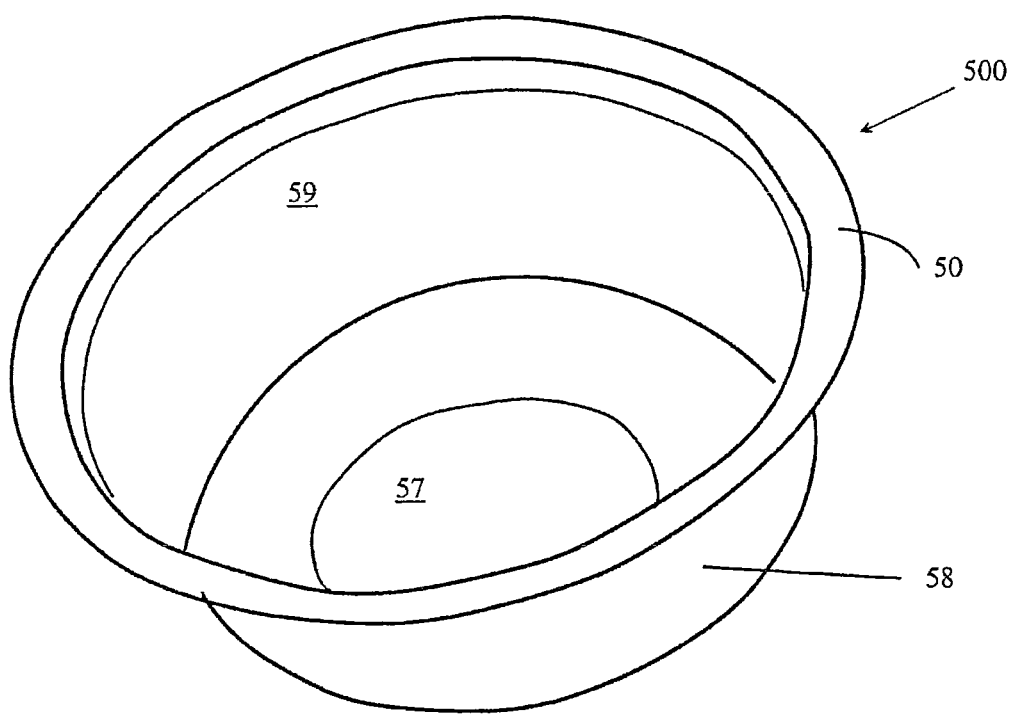
FIG. 2C is a perspective view of a container provided by a known mould system.

FIG. 1 is an exploded view of the main parts of the mould system according to the invention as viewed from the side and in cross section. The mould system 1 includes a movable mould half 10 or "rear mould" and a stationary mould half 20 or "front mould". The main parts of the movable mould half 10 comprise an ejection part 30 that comprises an ejection bar 31 and the two-piece body 3 of the ejection part, comprising between the parts 3a, 3b of the body, a pneumatic actuator 31 for providing compression between the mould halves 10 and 20. The movable mould half 10 further includes a plate-like seal ring 5, a plate-like collar ring 6 and a core plate 4, to which a (forming) core 41 is attached. The stationary mould half 20 includes a core plate 7, which comprises a mould cavity, against which the planar cardboard blank is shaped and which determines the general shape of the package (bottom, shape of side walls extending from bottom, inclination of walls, roundings etc.). The cardboard blank herein refers to a cardboard blank or a cardboard-based blank, wherein the cardboard is possibly coated with layers of plastic or metal to change its barrier properties. Furthermore, the stationary mould half 20 includes a mould frame 8, through which casting conduits are conveyed to the casting spot of the rim in a manner better shown in FIG. 2B.

The seal ring 5 has a plate-like shape and it surrounds the forming core 41 annularly and concentrically. A collar ring, which is movable in the depth direction with respect to the seal ring 5 and the forming core 41 and which is concentric with them, can be arranged between the front edge 5a1 of the seal ring 5 on the side of the core 41 and the forming core 41. The depth direction herein refers to the longitudinal direction of the core 41, which is perpendicular to the surface 4a of the core plate 4. The seal ring 5 comprises a seal surface 5a, which becomes flush with the face 41a of the moulding part of the core 41 at the compression stage (at the end of the compression). The face of the moulding part refers to the part of the core 41, which comes to the plane of the rim of the formed container, i.e., about to the plane of the seal surface 7a of the mould plate 7 and, at the same time, of the upper edge of the mould cavity 71. The moulding part of the forming core 41 shown in FIG. 1 is the part of the core 41, which can be fitted into the mould cavity 71. The moulding part of the forming core 41 shown in FIG. 1 and the corresponding mould cavity 71 have cross-sectional profiles of the shape of a rounded rectangle, whereby they can provide, correspondingly, a container that has a cross section of a rounded rectangle, which is shown, e.g., in FIG. 5A. The cross-sectional profiles of the mould cavity, forming core and container refer to the cross sections as examined in the depth direction of the mould system 1, i.e., perpendicular to the plane of the surface of the mould plate 7 and the core plate 4. If the cross-sectional profiles of the moulding part of the forming core and the mould cavity are changed, e.g., into the form of a circle, containers with a circular cross section are obtained, respectively, as shown, e.g., in FIG. 2C.

The seal surface 5a of the seal ring 5 is opposite to the corresponding seal surface 7a of the mould plate 7 that surrounds the mould cavity 71 of the front mould 20. The core 41 is further surrounded by the collar ring 6, which is capable of carrying out a short reciprocating motion with respect to the seal surface 5a of the seal ring 5, and the face 61a (=the seal surface 61a of the collar ring) of the collar 61 of the collar ring that is turned to the stationary mould half 20 can be moved to the same plane with the seal surface 5a of the seal ring 5 and to a very short distance backwards from it, away from the stationary front mould.

FIG. 2A shows the stationary mould half 20 that is used in a known mould system 1 and FIG. 2B shows the corresponding movable mould half. Regarding its functions and its mould structure, this mould system 1 is of the same type as the one according to the invention, its structure mainly deviating from the mould system according to the invention with respect to the structures of the seal ring 5 and the collar ring that surround the core 41. In the stationary mould half 20, in its front, there is the mould plate 7 that comprises a recess with the shape of a tray, i.e., the mould cavity 71. The mould plate 7 of the stationary mould half 20 is attached to the mould frame 8, through which the casting conduits (=hot channels and nozzles) are introduced. The movable mould half 10, in turn, comprises the forming core 41 in the front, which is attached to the core plate 4 below the same. The core plate 4 is attached to the ejection part 30 of the movable mould half 10. The core 41 is surrounded by the plate-like collar ring 6, which extends to the plane of the face 41a of the core moulding part and the seal surface 6a of which is flush with the face of the core, and by the plate-like seal ring 5, which comprises the seal surface 5a and is located outside the collar ring and limited to the collar ring.

Figure 3A:
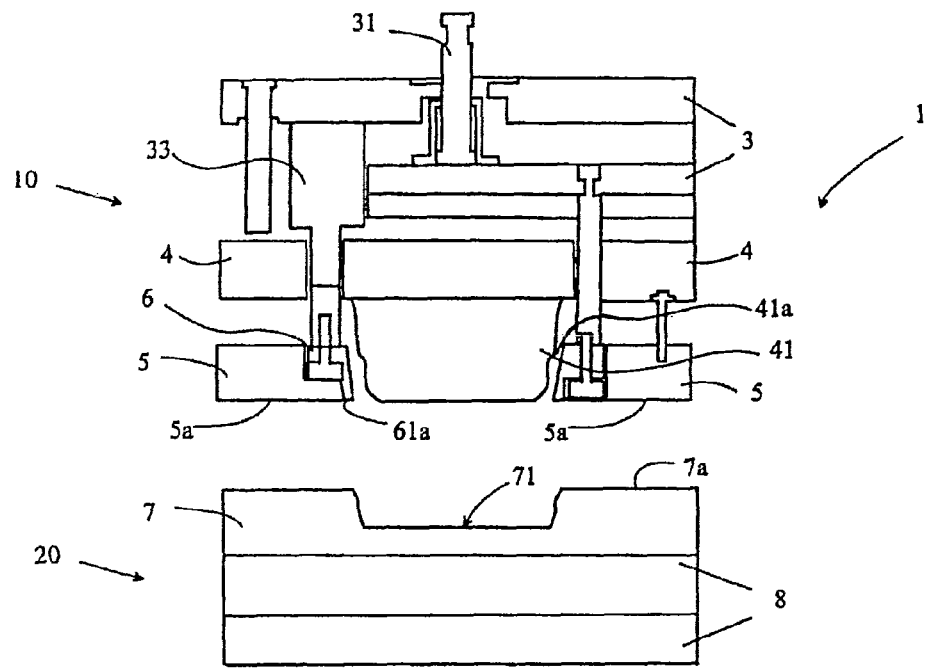
FIGS. 3A-3D show a longitudinal section of the operation of the mould system at the manufacturing stages of the various parts of the container.
Figure 3B:
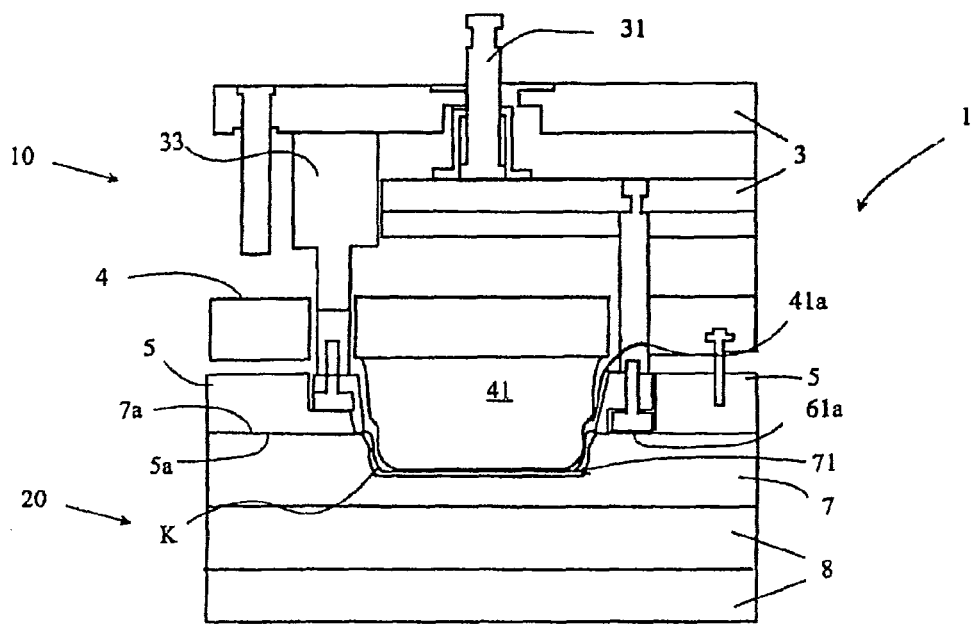

FIGS. 3A-3B show a cross-sectional side view of the mould system 1 according to the invention, its mould halves being the same as those described above in connection with FIGS. 1, 2A and 2B. The mould system 1 is used for forming the tray package, starting from pressing the package and ending in casting the rim. The mould system 1 comprises a compression moulding and casting mould, which is formed from two mould halves 10, 20 and the purpose of which is, at a first stage, to mould a container-shape tray package from an essentially straight and uniform cardboard blank K. A casting function is also integrated into the mould system 1 for casting a rim 50 on the edges of the walls of the package 500 that is shaped by compression.

The seal surface 61a of the collar ring 6 and the seal surface 5a of the seal ring 5 are brought to the same plane, which is transversal to the longitudinal direction of the core and which is in the direction of the plane defined by the mould plate 7, and they are pressed against the seal surface 7a of the mould plate 7, when the compression of the cardboard blank between the core 41 and the inner surface of the mould cavity 71 begins. The collar ring 6, core 41 and seal ring (sealing plate) 5 are located concentrically with respect to each other.

When the seal surface 61a of the collar 61 of the collar ring 6, i.e., the face 61a that is turned to the stationary mould half 20 is flush with the seal surface 5a of the seal ring 5, i.e., a common seal surface is formed by the seal surface 5a of the seal ring and the face or the seal surface 61a of the collar 61. When the mould is closed (the mould halves 10 and 20 are brought together) according to FIGS. 3B-3D, the seal surface 7a of the mould plate 7 of the stationary mould half 20 and the common seal surface 5a, 61a of the movable mould half 10 come against each other, so that the cardboard blank K to be shaped remains between them. The pneumatic actuator 33 between the parts 3a, 3b of the body 3 of the ejection part 30 is connected to the collar ring 6 and it pressurizes, through the collar ring 6, the seal ring 5 and, thus, the common seal surface 5a, 61a of the movable mould half 10 to provide a holding force between the mould halves 10 and 20, i.e., between the common seal surface 5a, 61a and the seal surface 7a of the stationary mould half. The main part of the compression or holding force exerted on the seal surface 7a and, besides, on the cardboard blank K between the seal surfaces 7a, 5a and 61a, is generated by the seal surface 5a of the seal ring 5, but the seal surface 61a of the collar 61 of the collar ring also exerts holding force on the cardboard blank K. The holding force can be adjusted by means of the actuator 33, such as a compressed air cylinder, which works on a pressure medium. The collar ring 6 is located inside the ejection part 3 between the seal ring 5 and the core 41.

The two-piece body 3 of the ejection part 30 and the core plate 4 that comprises the core 41 can be moved by the ejection bar 31 in the depth direction with respect to the stationary mould half 20, whereby the depth direction refers to the same as above. The movable mould half 10 thus moves between a front position (shown in FIG. 3A) and a rear position (shown in FIGS. 3B-3D).

At the compression stage, the movable mould half 10 in the mould system presses the cardboard blank A into the mould cavity 71 of the mould plate 7 of the stationary mould half 20. For this, the movable mould half comprises the forming core 41 that is located on the core plate 4, its forming part fitting into the above-mentioned mould cavity 71 up to the face 41a of the core, so that the cardboard blank is pressed between the core 41 and the cavity 71, obtaining its tray shape. The movable mould half 10 is arranged to move with respect to the stationary mould to close and open the mould by arrangements that are not described herein in detail.

FIG. 3A shows the mould system 1 before closing the mould. The cardboard blank K is brought by a robot to the small holders (not shown) on the mould plate 7 of the stationary mould half 20. After this, the mould is closed, i.e., the core 41 settles into the mould cavity 71 and the cardboard blank K remaining between them is pressed into a tray-shape container.

The stage, at which the core 41 begins to shape the blank after settling into the cavity 71, is shown in FIG. 3B. The seal surfaces, i.e., the seal surface 5a of the seal ring and the seal surface 61a of the collar ring lean on the cardboard blank K by the force of the actuator 33 and retain the blank K at its edges at the compression stage between the said seal surfaces 5a and 61a and the seal surface 7a of the mould plate 7 of the stationary mould half.

Figure 3C:
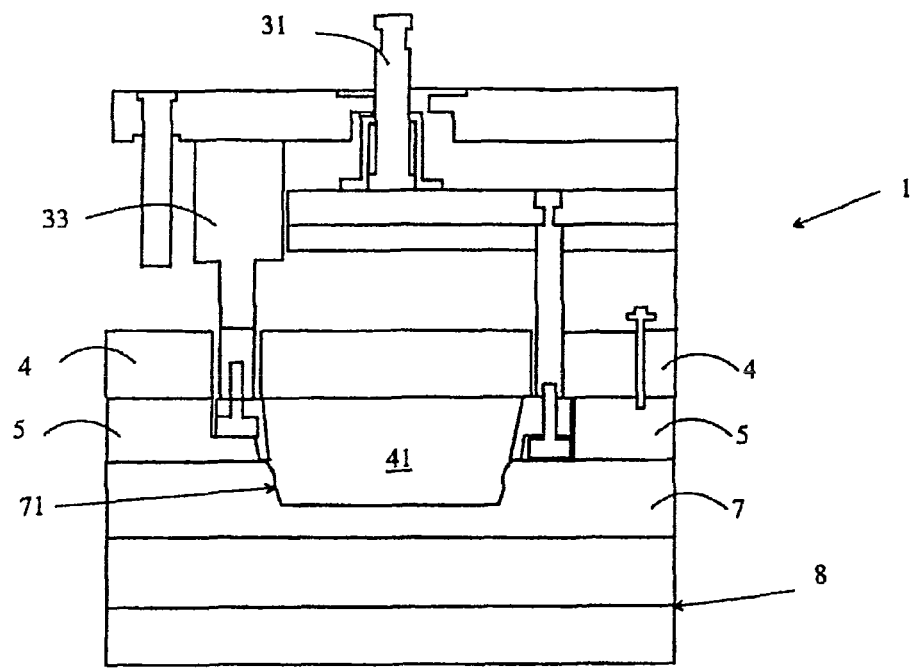

FIG. 3C shows a situation, where the mould is fully closed, the mould halves 10 and 20 being pressed against each other and the cardboard blank K between them is pressed into a tray, so that the upper edge of the side walls of the tray is flush with the seal surface 61a of the collar ring 6 or slightly in front of it. The last holding force on the edges of the blank is caused by the face 61a of the collar 61 of the collar ring 6, against which there is the seal surface 7a of the mould plate that surrounds the cavity 71 of the stationary mould half.

Figure 3D:
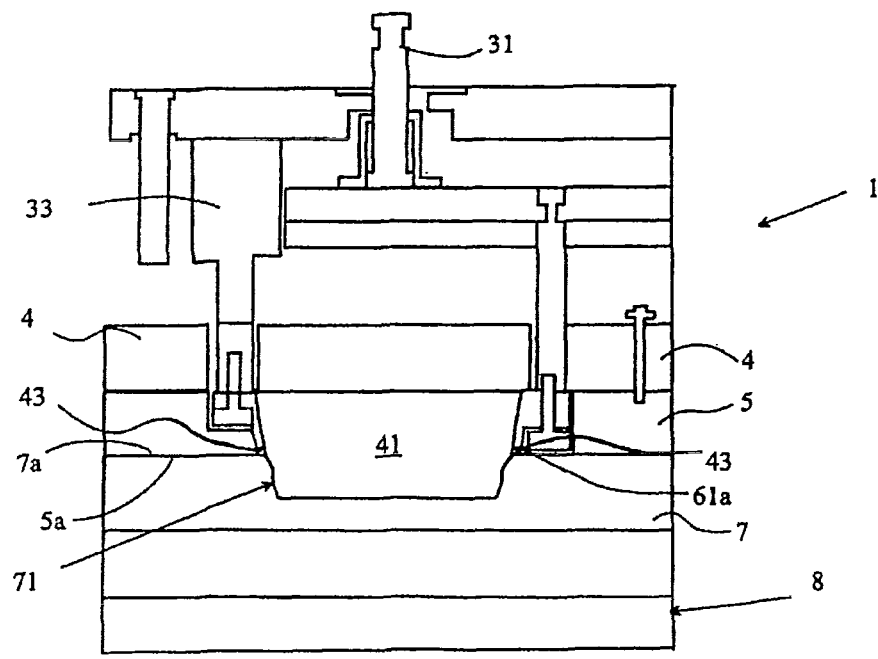

FIG. 3D shows a situation, where the mould is still closed, but the collar ring 6 has moved a short distance backwards from the seal surface 71a of the stationary mould half 20, i.e., in the longitudinal direction of the core in the direction of the ejection part 3 of the movable mould half 10. The movement is provided by an actuator performing precise movements, e.g., by pulling the ejection bar 31 by an ejection motor. A small casting cavity 43 remains then between the seal surface 7a that surrounds the cavity 71, the seal surface 5a of the seal ring 5, the face 61a of the collar 61 of the collar ring 6 and the face 41a of the core 41, being in contact with the outer edge of the tray, encircling the tray annularly. When the molten plastic material is fed into this casting cavity 43, it forms a flange-like rim that extends outwards from the side walls of the tray. Due to its shape, the collar ring 6 is tightened against the forming core 41 to ensure the tightness of the casting cavity 43. The injection channel of the casting material is arranged through the mould frame 8 of the stationary mould half 20, e.g., as shown in FIG. 2B, and the plastic to be cast moves through there to the casting cavity 43. The injection channels can also be arranged to arrive in the injection cavity in another manner, depending on the structure of the container that is shaped.

After the molten plastic material has solidified in the casting cavity 43, the mould can be opened to its open position again. The ejection part 3 is then still in the rear position. When the ejection part 3 is pushed by the ejection rod 31 to the front position, it removes the finished container from the moving mould half 10 and, at the same time, the collar ring 6 can be moved to the front position again, i.e., the position shown in FIG. 3A is reassumed. The seal surface 7a of the mould plate 7 of the front mould 20 then works as ejection surface, against which the ejection bar 31 pushes, when the finished container is removed from the mould. After this, the robot takes the finished container out and replaces it with a new blank K, after which the working phases are repeated as above.

Figure 5A:
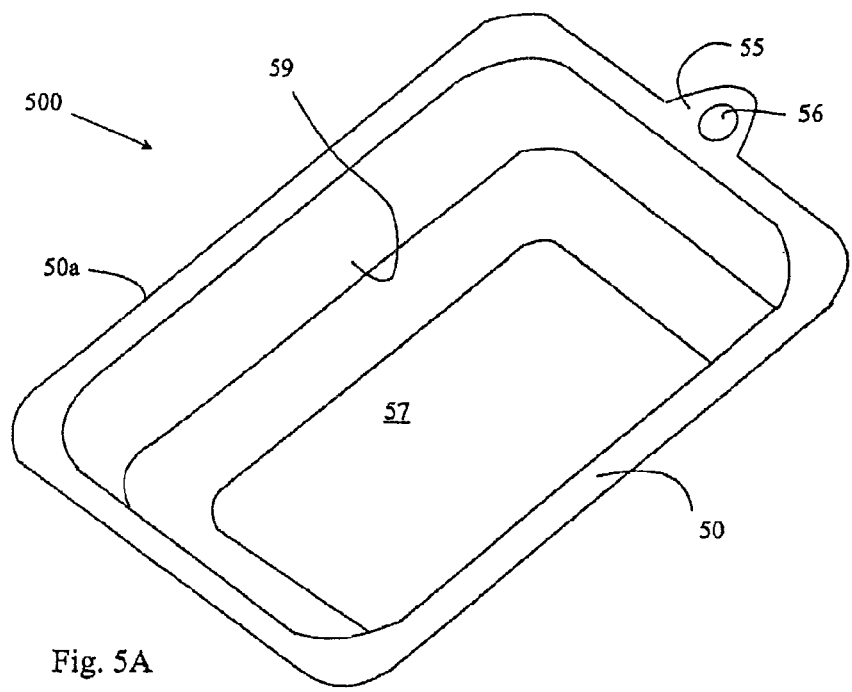
FIGS. 5A and 5B are perspective views of the containers provided by the rear mould according to the invention.

If the suspension means 56 or the projection 55 of the basic rim of a regular annular shape were not provided in the tray-shape container 500, which is shown in FIG. 5A and which consists of a cardboard or cardboard-coated tray frame, i.e., bottom 57 and walls 59, which are connected to the bottom and extend upwards from the bottom plane, and a plastic flange-like basic rim 50 that encircles the upper edge of the walls 59 of the frame and extends outwards, they could be manufactured by the so-called basic casting method described above. However, when various decorative or functional shapes, suspension means or projections are to be formed on the basic rim 50 of the tray-shape container 500 according to FIG. 5A by the same front and rear moulds, the collar ring 5 or the sealing ring 6 must be modified to provide them.

Figure 4A:
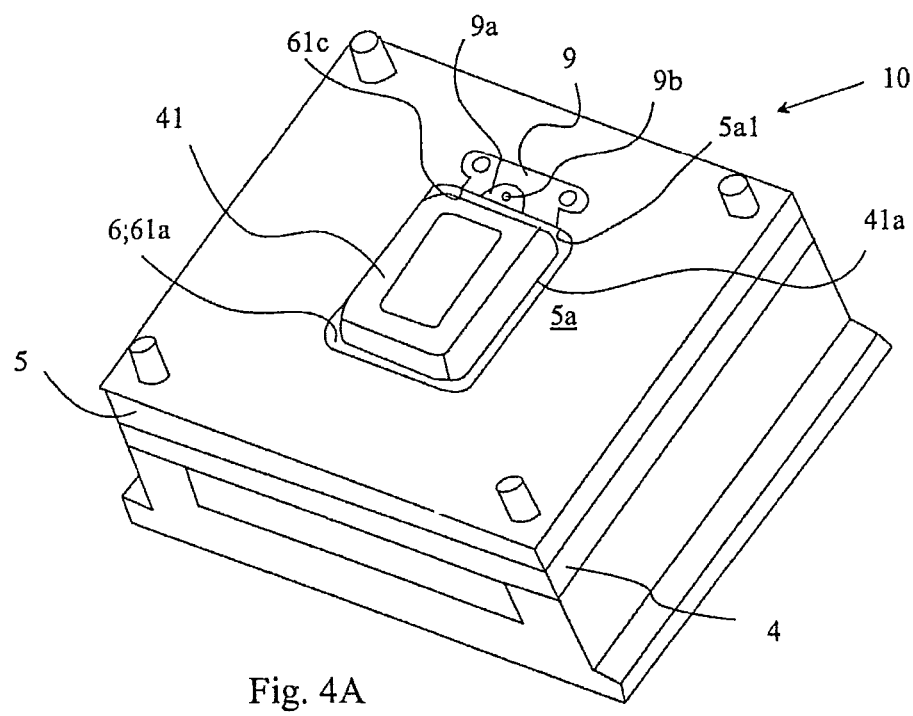
FIG. 4A is a perspective view of the parts of the rear mould according to an embodiment of the invention.

The rim of the container 500 according to FIG. 5A is modified with respect to the standard model (e.g., FIG. 2C) by forming therein, by the mould system 1, a projection 55, through which a suspension opening 56 goes and which is connected to the outer edge 50a of the annular basic rim 50. Such a projection 55 can be provided by the rear mould 10 according to FIG. 4A, which differs from the rear mould 10 shown in FIG. 2B in that an insert 9 is attached to the seal surface 5a of the seal ring 5 on the side of the mould cavity, on the front edge 5a1 of the seal surface and next to the seal surface 61a of the collar ring 6. The insert 9 has a general shape of a plate and, in its frame, there is embedded a recess 9a with the shape of the intended projection, its front edge peripherally encircling the front edge 5a1 of the sealing edge, and the frame of the insert being directed in the radial direction of the seal ring (sealing plate) away from the front edge of the sealing edge. The frame of the insert comprises a recess, which has the shape of the projection 55 that is limited to the basic rim and shown in FIG. 5A and which is in contact with the front edge 5a1 of the seal surface. The recess 9a comprises a bulge 9b, which has the shape of the suspension opening 56 that is visible in the projection 55 and extends upwards towards the free upper surface of the plate-like body of the insert. The recess 9a of the insert 9 is in contact with the front edge of the seal surface, so that when the seal surface 5a and the seal surface of the collar ring 6 next to it are brought to the same plane and pressed towards the seal surface of the mould plate of the front mould, the recess 9a settles next to the seal surface of the collar ring. This enables the flow of molten plastic from the direction of the collar ring into the recess 9b, when the seal surface 61 of the collar ring 6 is pulled back and away from the front mould in the longitudinal direction of the core.

The projection 55 of the basic rim 50 is cast on the container 500 simultaneously with casting the basic rim 50. In a manner similar to that illustrated in FIG. 3D, the molten plastic flows into the casting cavity, which is limited to the core 41 that now, however, consists of a space, which in the direction of the front mould is limited by the seal surface 7a of the mould plate; and in the direction of the rear mould by the seal surface 61a of the collar ring 6, which is slightly pulled backwards in the longitudinal direction of the core, and by the plate-like insert 9, which is attached to the seal surface 5a of the seal ring 5, and by the seal surface 5a of the seal ring, whereby the seal surface 5a of the seal ring the frame of the insert 9 have been pressed against the seal surface of the mould plate. The casting cavity 43 in the direction of the rear mould is further limited by the base of the recess 9a of the insert 9, which base comprises the bulge 9b. Being limited to the front edge of the sealing ring, the recess 9a is in flow communication with the molten plastic that flows from the direction of the collar ring. In the direction of the core, the casting cavity is further limited by the face 41a of the core 41. By such a casting cavity 43, the basic rim 50 and, simultaneously, also the projection 55 that is an extension of the basic rim 50 are formed on the container.

The basic rim herein refers to the plastic rim 50, which can be cast on the upper edge of the container wall by using, in the casting, a casting cavity, which is not formed by means of the insert 9, i.e., it is formed by using the collar ring alone.

Figure 4B:
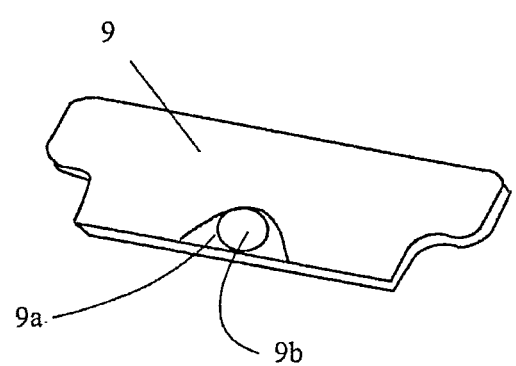
FIG. 4B is an enlarged view of the insert of the rear mould according to FIG. 4A.
Figure 5B:
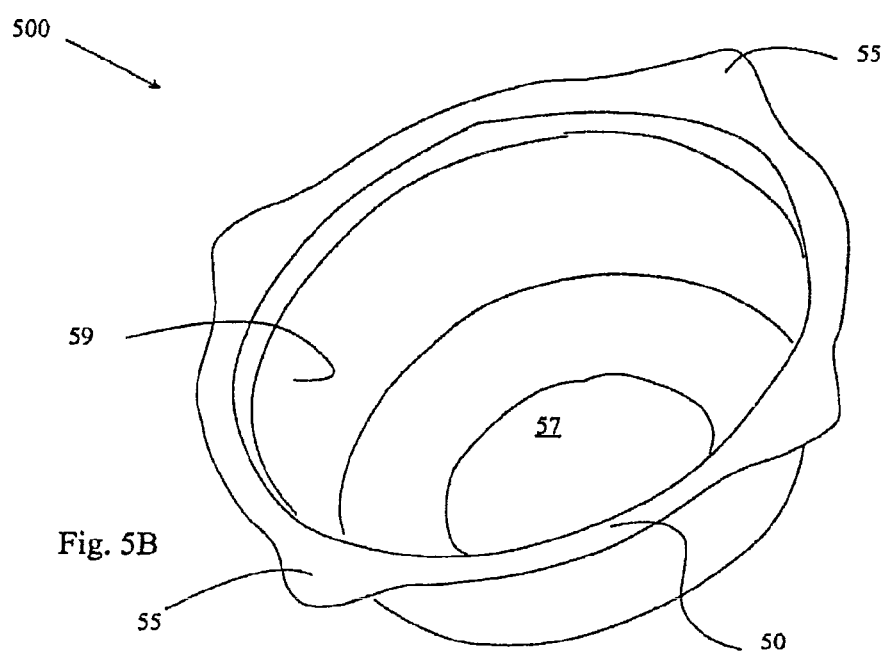

A rear mould 10 similar to that shown in FIG. 4 can also be used in manufacturing the container 500 shown in FIG. 5B, which has a round bottom and an annular cross section of the wall 59, several projections 55, which have a cross sectional profile of the shape of a circular arch, being attached to the basic rim 50 that encircles the upper edge of the container wall 59 and has the shape of a ring. Such a container with the shape of a round-bottom cup is formed by the mould system 1, the base of the mould cavity 71 of the front mould 20 of the system being circular and the shape of the mould cavity walls having an annular cross-sectional profile, thus corresponding to the shape of the cup walls 59. The cross section of the forming part of the forming core 41 of the rear mould that is fitted into the mould cavity 71 is also circular and the shape of its outer surface 41b that shapes the container bottom is also circular, thus corresponding to the shape of the mould cavity bottom. The flange-like basic plastic rim 50 can be made on the container by the method described above by introducing molten plastic into the casting cavity 43 between the seal surface 61a of the collar ring 61, the seal surface 5a of the seal ring 5 and the seal surface 7a of the mould plate 7 and the face 41a of the core through the casting conduits in the front mould. The basic ring 50 is now modified by attaching, to the seal surface 5a of the seal ring 5, a number of inserts 9, which are provided with a recess 9a and which have the shape of the insert 9 shown in FIG. 5A, but which do not necessarily have the blank of the suspension means 9b located in the recess 9a, however. The inserts 9 are attached so that each insert is limited to the periphery of the annular front edge 5a1 located in the front part of the annular seal surface 5a of the seal ring 5. When the seal surface 5a of the seal ring is flush with the face 61a of the collar of the collar ring 6, the insert 9 is limited to the outer edge 61c of the seal surface 61a of the collar 61 (i.e., the insert 9 begins from the edge 5a1 of the seal surface 5a of the seal ring on the side of the collar 6). The inserts are located in the front part of the seal surface 5a of the seal ring, at a regular peripheral distance of the front edge 5a1 of the seal surface 5a from each other. Each insert comprises a recess 9a with the shape of about a semi-circle. When the seal surfaces 5a of the seal ring 5 are provided with such inserts 9, which comprise recesses 9a of semi-circular cross-sectional profiles, a mould cavity 43 is formed at the manufacturing stage of the container corresponding to FIG. 3D, the cavity being limited by the seal surface 61a of the collar of the collar ring 6, the face 41a of the core and the seal surface 71a of the mould plate that comprises the recesses 9 of the semi-circular shape. When the molten plastic flows into the mould cavity 43, the projections 55 of the basic rim 50 shown in FIG. 5B are formed.

By the above technique, the cardboard-based containers 500 shown in FIGS. 8 and 9 can also be manufactured, their basic rims being unsymmetrical or rectangular and their basic rims including projections, which can have openings of different forms (FIG. 9).

Various functional or decorative shapes can also be added to the basic rim 50 of the container 500, as well as shapes and ridges that extend upwards from the edge. The shapes are provided by connecting a raising collar 612 that is used as an insert to the annular basic collar 61; 611 of the collar ring 6. This raising collar consists of a similarly annular raising collar 61; 612 that is detachably attached on top of the annular basic collar 61; 611. These raising collars 612 that are attached to the basic collar 611 of the collar ring 6 are shown in an exemplary manner in FIGS. 6A-6C, and various modifications of the rim 50 of the container 500 that are provided by the raising collars are shown in FIGS. 7A-7D, respectively. The shape A of the opening in the middle of the collar ring 6 and the collar may vary, which is why the concept "annular" in connection with the collar ring or the collar or parts of the collar (raising collar or basic collar) mainly means that there is an opening in the middle of the body of the part in question. When viewed from above, the body 62 of the collar ring 6 can have a cross-sectional profile of a round, rectangular or other shape, and in the middle of the body 62, there is an opening A of a round, rectangular or other shape. The shape of the opening A defines the shape of the collar 61 that encircles its edges.

The raising collar 612 should fit tightly on top of the basic collar 611; therefore, when examining the collar ring from above, the cross-sectional profiles of the basic collar 611 and the raising collar 612 should be congruent at least at the junction of the basic collar 611 and the raising collar 612. The seal surface 61a of such a collar ring 6 that is provided with the raising collar 612 is then the same as the upper surface 612a of the raising collar 612. The seal surface 612a of the raising collar is now provided with recesses, which correspond to these desired functional or decorative shapes of the rim, or with very low and wide bulges or decorative embossed patterns or bulges located in the recesses, which do not yet extend higher than the rest of the plane of the seal surface. When the molten plastic flows into the casting cavity 43, when the container rim 50 is cast at the working phase according to FIG. 3D, the seal surface 612a of the raising collar 612, which works as a wall that limits the casting cavity on one part thereof, forms bulges on the rim 50 that is formed, and recesses between these bulges, which are on about the plane of the rest of the rim surface. The shapes, which are formed on the rim 50 of the container 500 and which extend upwards from the rest of the plane of the rim surface, can be changed by simply replacing the old raising collar 612 on the basic collar 611 with a new raising collar, on the seal surface 612a of which the desired formations are located. When so desired, the raising collars 612 can also change the width I of the rim by changing the width I of the seal surface 612a of the raising collar 612, whereby the size of the opening in the middle of the seal plate 5 that comes next to the seal surface of the raising collar at the casting stage of the rim must then also be changed, respectively, e.g., by adding to the seal plate or removing from the same a suitable insert.

FIG. 6A shows a collar ring 6, which has a body 62 with the shape of a rectangle with rounded corners; a collar 61, which also has a general shape of a rounded rectangle and a width T and a length P, encircling the edge of the rengtangular opening A that is in the middle of the collar ring, the collar extending upwards from the plane of the body 62 of the collar ring. The width T and length P refer to the dimensions of the collar inner diameters and, as well, the inner dimensions of the edge of the opening A. The collar 6 consists of a lower basic collar 611, which is attached to the plate-like body 62 of the collar ring, and an insert, the raising collar 612, which is attached on top of the basic collar 611. Both the raising collar 612 and the basic collar 611 are of the same shape and their width and length dimensions in the direction of the plane of the body 62 of the raising ring 6 are the same. The raising collar 612 can be attached to the basic collar by a suitable joint that can be opened, such as a screw joint or a mortise joint. FIG. 6B shows a collar ring 6, two grooves 70; 70a, 70b that encircle the seal surface 612a of the raising collar being formed on the seal surface 612a that is on top of its raising collar 612. These grooves 70a and 70b, respectively, provide the basic rim 50; 54, which is modified on the container 500 according to FIGS. 7A and 7B and in which two parallel ridges 80; 80a and 80; 80b that extend slightly upwards from the plane of the rim encircle the container rim 50; 54. FIG. 6C shows a collar ring 6, on the seal surface 612a of the raising collar 612 of which three grooves 70; 70c, 70d, 70e encircling the annular seal surface 612a of the raising collar in parallel are formed. Between the adjacent grooves 70, recesses are located at regular intervals from each other and transversally to the direction of the grooves. The transversal recesses between the grooves and the grooves themselves thus together constitute a ladder-type groove/recess grooving. The seal surface 612a of the collar ring that is provided with such a ladder-type grooving can be used to make the containers 500 shown in FIGS. 7C and 7D, the modified rim 50; 54 of which is encircled by three parallel ridges 80; 80c, 80d, 80e that extend slightly upwards from the rest of the plane of the container rim, cross ridges 80f transversal to the direction of the ridges 80 being provided between them. Corresponding depressions run between the ridges 80c, 80d, 80e, 80g of the rim, which are approximately on the plane of the rest of the rim surface.

The invention is illustrated above by a few exemplary embodiments only and it is obvious to those skilled in the art that the invention can also be implemented in various other ways within the scope of the invention disclosed in the claims.

For example, the width of the plastic rim 50 that is cast on the container 500 can be changed by a collar ring 6, the raising collar 612 of which comprises a seal surface 612a wider than the basic collar 611. The size of the seal ring opening is then also changed, correspondingly.

The recesses 9a in the inserts 9 can have quite different shapes, depending on the use of the projections 55 that are made of the inserts. The projections are used, among others, as decorations, hinges, closures or handles. Therefore, they can also have the shape of a circle, semi-circle, rectangle, trapezium or combinations thereof, among others. Each recess can then have bulges of different heights and shapes, e.g., 1-3 similar or different bulges; their heights may vary, as the bulges produce both the openings through the projection 55 and also the recesses in the projection, and the shapes of the openings and recesses may vary.

The invention claimed is:

1. A mould system for manufacturing a container having a bottom pressed from a cardboard blank, walls connected to the bottom and a flange-like rim that is at least partially cast of a plastic material and connected to the upper edge of the walls, encircling the walls, which comprises a movable mould half and a stationary mould half which are positioned opposite to each other, wherein the mould half which is movable relative to the stationary mould half includes at least a core plate provided with a core, a plate-like seal ring that is movable relative to the core and includes a seal surface which surrounds the core, and a collar ring that is movable relative to the core and the seal ring and is fitted therebetween, and the stationary mould half includes at least a mould plate provided with a mould cavity and a seal surface, wherein in the mould system, a plate-like insert is connected to the seal surface of the seal ring, its one edge being on a plane defined by the front edge of the seal surface; the insert including a recess, which has the shape of a projection that is cast on the basic rim and the recess is in contact with a front edge of the seal surface, so that it is in flow communication with molten plastic material flowing from the direction of the collar ring.

2. The mould system according to claim 1, wherein the recess of the insert has one or more bulges that are directed towards the upper surface of the frame of the insert, wherein the bulges have the same or different depths.

3. The mould system according to claim 1 or 2, wherein one or more detachable inserts are attached to the top of the sealing surface of the seal ring of the movable mould half of the mould system, such that, on its surface, which is directed towards the stationary mould half, on the periphery of the front edge, that is limited to the collar ring of the seal surface, the inserts are used to form projections that are directed outwards from the container basic rim, the dimension of each insert in the direction of the front edge being, at a maximum, 10-30% of the entire peripheral length of the front edge.

4. The mould system according to claim 1, wherein the recesses in the inserts have circular, semi-circular or rectangular shapes or combinations of these shapes.

5. The mould system according to claim 4, wherein the recesses comprise bulges which can have round, rectangular or other shapes, and the height of the bulges may vary.

6. A method of manufacturing a container by the mould system according to claim 1, wherein the cardboard blank is pressed between the core and the mould cavity to provide the bottom and walls that encircle the bottom, after which the flange-like rim that encircles the walls is formed by casting on the upper edge of the walls by introducing a molten plastic into the casting cavity, which is limited by the seal surface of the mould plate, the seal surface of the seal ring and a seal surface of the collar ring, whereby the shape and/or dimensions of the casting cavity are changed by arranging, on the front edge of the seal surface of the seal ring, the at least one detachably attached plate-like insert, which comprises said at least one recess that is embedded in the plate-like frame of the insert and has the shape of the intended projection and, in the recess, at least one bulge is disposed that extends upwards towards the surface of the plate-like frame, whereby the recess of the insert is in contact with the front edge of the seal ring.

7. The method according to claim 6, wherein the cardboard blank is retained between the seal surface of the seal ring and the seal surface of the collar ring and the seal surface of the mould plate opposite the same at least until the cardboard blank has slid into the mould, cavity, and the casting cavity is not provided in the mould system until after this for forming the flange-like rim that encircles the container walls and at least partly consists of said plastic.

* * * * *